UNITED STATES PATENT OFFICE.

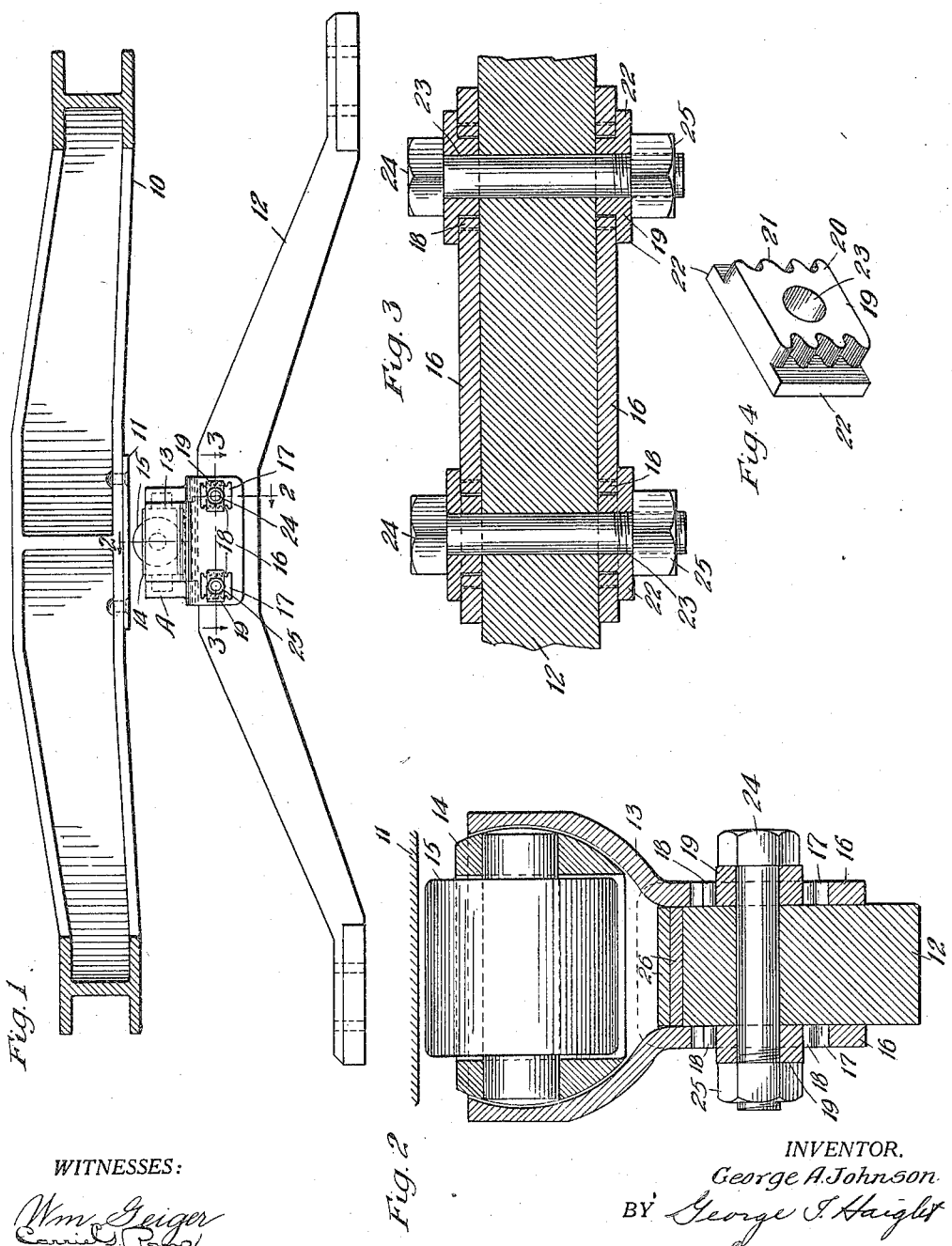

GEORGE A. JOHNSON, OF CHICAGO, ILLINOIS, ASSIGNOR TO WILLIAM H. MINER, OF CHAZY, NEW YORK.

ADJUSTABLE SIDE BEARING.

1,180,487. Specification of Letters Patent. Patented Apr. 25, 1916.

Application filed November 30, 1914. Serial No. 874,667.

*To all whom it may concern:*

Be it known that I, GEORGE A. JOHNSON, a citizen of the United States, residing at Chicago, in the county of Cook and State of Illinois, have invented a certain new and useful Improvement in Adjustable Side Bearings, of which the following is a full, clear, concise, and exact description, reference being had to the accompanying drawings, forming a part of this specification.

This invention relates to improvements in adjustable side bearings.

An object of the invention is to provide an adjustable side bearing of simple and relatively inexpensive form and which may be applied to cars now in service without the necessity of changing any of the parts of the car under-frame or trucks.

A more specific object of the invention is to provide an adjustable side bearing for passenger cars wherein the side bearing is attached to the side bearing bridges of the trucks by means of bolts.

The invention furthermore consists in the improvements in the parts and devices and in the novel combinations of the parts and devices, as herein shown, described or claimed.

In the drawing forming a part of this specification, Figure 1 is a side elevation of a portion of an under-frame of a car and the side bearing bridge of a six wheel truck showing my improved bearing employed therewith. Fig. 2 is an enlarged vertical sectional view taken substantially on the line 2—2 of Fig. 1. Fig. 3 is a horizontal sectional view taken substantially on the line 3—3 of Fig. 1 and also upon an enlarged scale and Fig. 4 is a detail perspective view of one of the adjusting blocks employed.

In said drawing, 10 denotes the side member of a passenger car under-frame, to which is secured by rivets or other suitable means, a striking plate 11.

12 denotes a side bearing bridge of a six wheel passenger truck to which is attached the improved side bearing A.

The side bearing A comprises a base casting 13 having a cradle 14 rockably mounted therein, the cradle having an anti-friction roller 15 rotatably mounted therein. The base casting 13 is provided with spaced depending flanges 16 which fit down over the sides of the side bearing bridge 12. Each of these flanges 16 is provided with a recess 17 near the ends thereof, the vertical walls of said recesses 17 being provided with notches and serrations 18, as shown in Fig. 1. A plurality of adjusting blocks 19 are provided, one for each of the recesses 17, and as shown, each adjusting block 19 comprises a portion 20 having vertical notched and serrated edges 21 corresponding in size and shape to the notches and serrations 18 formed in the flanges of the base casting. Each block 19 furthermore is provided with an outer plate or flange 22 which fits over the depending flanges 16. All the blocks 19 are also centrally perforated as indicated at 23 to receive bolts 24 therethrough, it being understood that the bolts pass through corresponding holes provided in the side bearing bridge 12.

As clearly shown in Fig. 1, the number of notches and serrations in the blocks 19 is less than the number of notches and serrations in the flanges of the base casting so that the adjusting blocks are adapted to be positioned in any one of a number of positions in the flanges 16. To adjust the side bearing, the blocks 19 are placed in the desired notches in the flanges 16, after which the bolts are passed through the perforations 23 in said blocks and through the side bearing bridge. When the nuts 25 are tightened on the bolts it will be apparent that the blocks are firmly held and consequently the base casting and in this connection it will be observed that the flanges 22 on the adjusting blocks securely clamp the flanges 16 against the sides of the side bearing bridge 12. In the event that the base casting 13 is raised so as to be out of engagement with the top pawl of the bearing bridge, shims 26 may be employed to help take the thrust on the base casting and transmit the same to the side bearing bridge, thus relieving the shearing strains on the bolts.

Although I have herein shown and described what I now consider the preferred embodiment of my improvement, yet I am aware that changes may be made without departing from the spirit of the invention, such for instance as variations in the means of adjusting the blocks with respect to the base casting, and I contemplate all changes that come within the scope of the claims appended hereto.

I claim:—

1. In an adjustable side bearing, the combination with a base casting, of blocks adapted to be secured to a part of a truck, said blocks and casting having vertically arranged series of interengaging projections and notches permitting relative vertical adjustment therebetween, the blocks being adapted to always occupy the same position relatively to the truck part to which they are attached.

2. An adjustable side bearing for railway cars comprising a base casting, blocks having notched faces and adapted to be secured to a portion of a car, said casting having flanges provided with openings, edges of which are notched to correspond with the notched faces of said blocks.

3. An adjustable side bearing for railway cars comprising a base casting, blocks having notched faces and adapted to be secured to a portion of a car, said casting having flanges provided with openings, edges of which are notched to correspond with the notched faces of said blocks, said blocks having flanges adapted to overlap the flanges of said casting when the parts are secured in position.

4. An adjustable side bearing for railway cars comprising a base casting having depending flanges adapted to fit over a side bearing bridge, each of said flanges being recessed and the edges of said recesses being notched, blocks adapted to be secured to the sides of said side bearing bridge, said blocks having notched edges coöperable with said notched portions of the flanges.

5. In a side bearing for railway cars, the combination with a base casting having spaced flanges adapted to fit over the sides of a side bearing bridge, each of said flanges being provided with recesses the edges of which are notched, a plurality of blocks adapted to be bolted to the sides of said side bearing bridge, there being one block for each of said recesses and each block having notched edges coöperable with said notched flanges, each block having also flanged portions adapted to overlap the flanges of said base casting.

GEORGE A. JOHNSON.

Witnesses:
CARRIE G. RANZ,
LUCILLE HIGGINS.

Copies of this patent may be obtained for five cents each, by addressing the "Commissioner of Patents, Washington, D. C."